US 8,176,716 B2

(12) United States Patent
Coers et al.

(10) Patent No.: US 8,176,716 B2
(45) Date of Patent: May 15, 2012

(54) FLEXIBLE REEL FOR AN AGRICULTURAL HARVESTING HEAD

(75) Inventors: Bruce Alan Coers, Hillsdale, IL (US);
James K. Adamson, Colona, IL (US);
Mark L Pearson, LeClaire, IA (US);
Janet R Willett, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/872,853

(22) Filed: Aug. 31, 2010

(65) Prior Publication Data

US 2012/0047867 A1    Mar. 1, 2012

(51) Int. Cl.
*A01D 89/00* (2006.01)
(52) U.S. Cl. ........................................................ 56/364
(58) Field of Classification Search .................... 56/14.4, 56/15.8, 220, 226–228, 364; 198/518
See application file for complete search history.

(56) References Cited

U.S. PATENT DOCUMENTS

| 3,546,863 | A | | 12/1970 | Connolly |
| 4,184,314 | A | * | 1/1980 | Hobbs ............................ 56/372 |
| 4,409,780 | A | * | 10/1983 | Beougher et al. ............... 56/228 |
| 4,464,890 | A | * | 8/1984 | Scholtissek et al. ............ 56/364 |
| 4,487,004 | A | * | 12/1984 | Kejr .............................. 56/14.4 |
| 5,822,959 | A | * | 10/1998 | Norton ............................. 56/1 |
| 7,866,136 | B1 | * | 1/2011 | Hill et al. ........................ 56/364 |
| 2006/0185340 | A1 | | 8/2006 | Eyre |
| 2007/0204583 | A1 | | 9/2007 | Coers |
| 2008/0295473 | A1 | | 12/2008 | Tippery et al. |

OTHER PUBLICATIONS

European Search Report Dec. 6, 2011, 7 pages.

* cited by examiner

*Primary Examiner* — Alicia Torres

(57) ABSTRACT

A flexible reel (100) for an agricultural harvesting head (115) includes a plurality of reel sections (102, 104, 106) coupled together with flexible joints (210), wherein bats (206, 218) mounted on one reel section (102, 104, 106) overlap and interleave with the bats (206, 218) of an adjacent reel section (102, 104, 106).

9 Claims, 5 Drawing Sheets

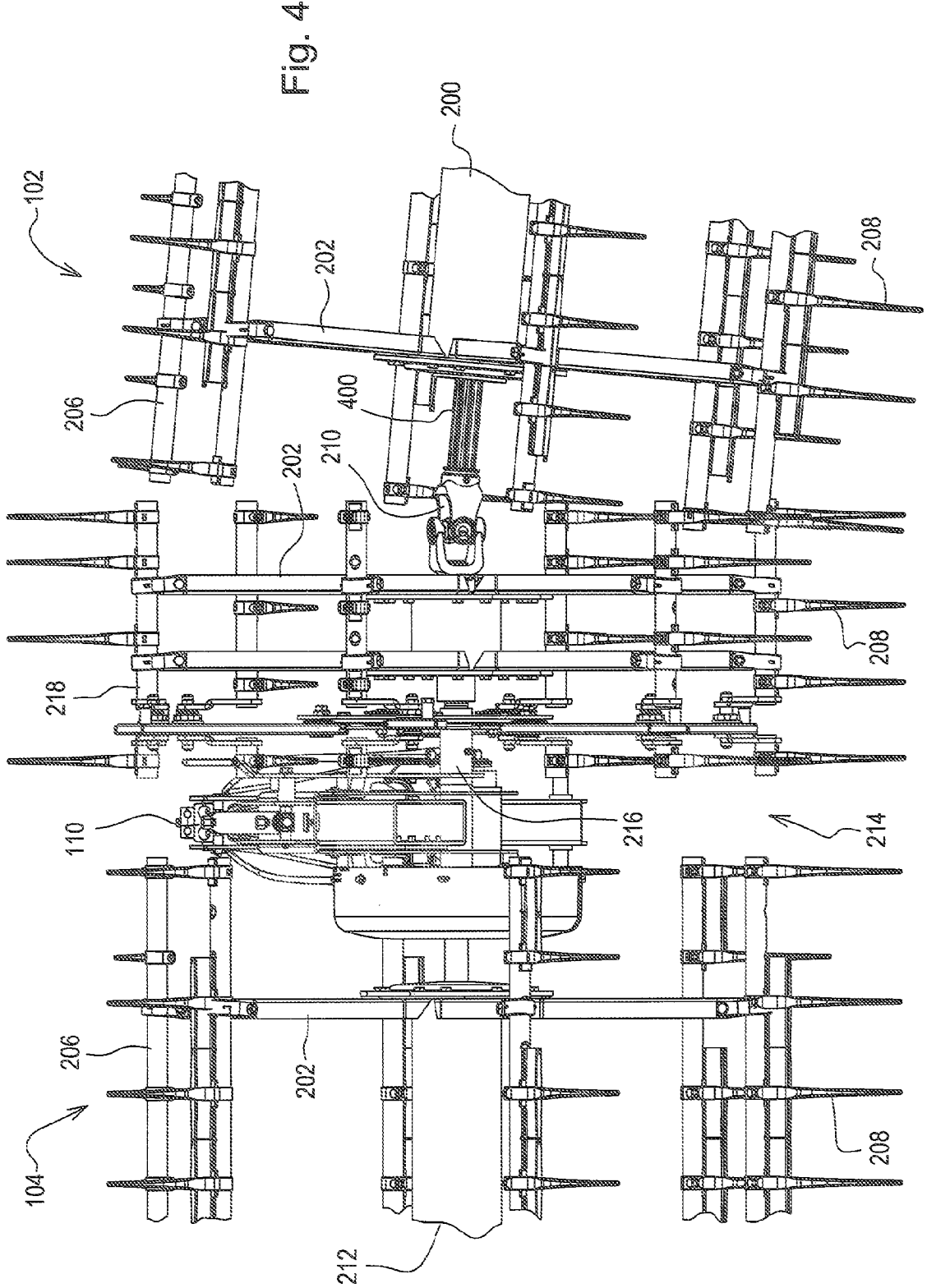

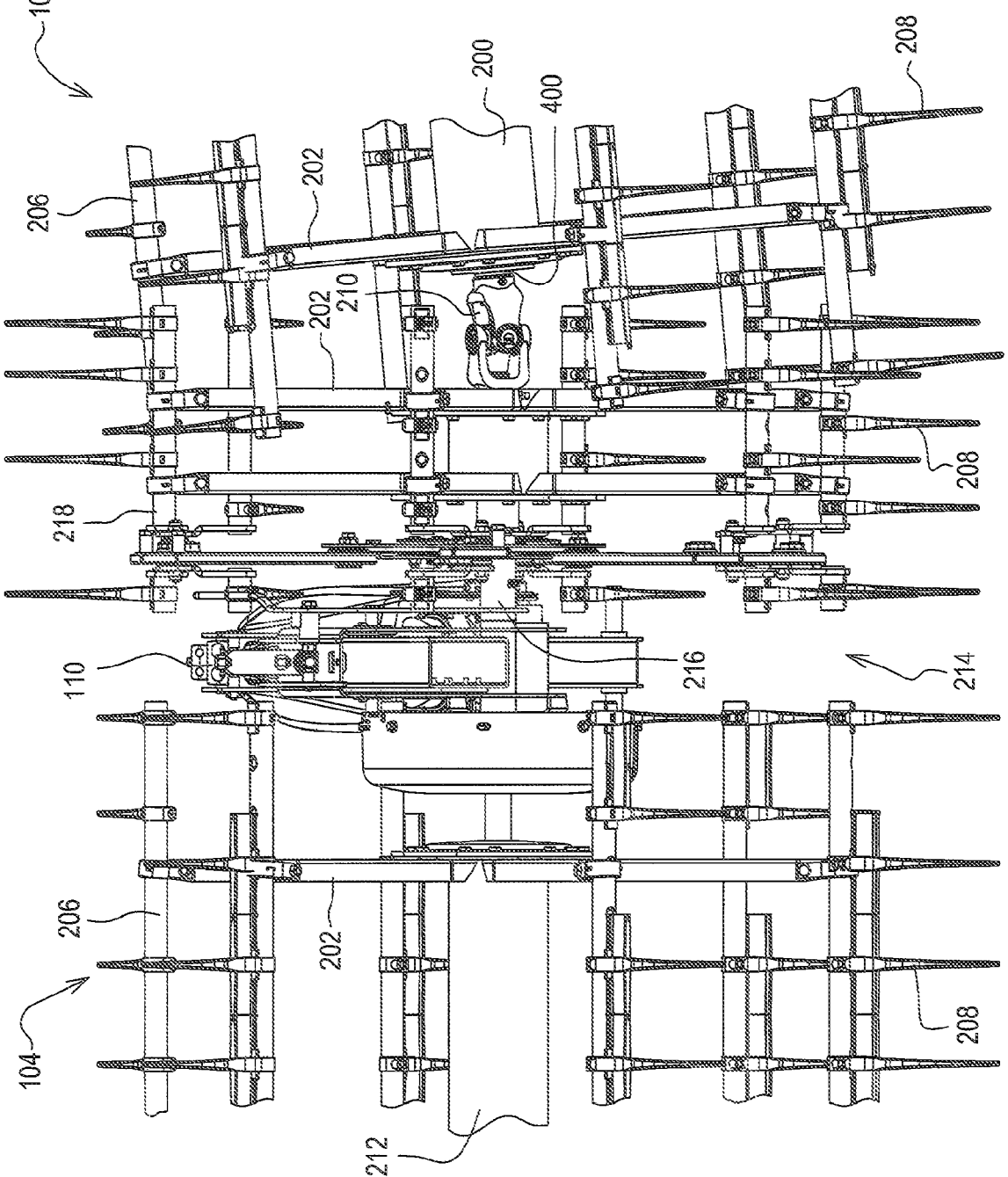

FLEXIBLE REEL FOR AN AGRICULTURAL HARVESTING HEAD

FIELD OF THE INVENTION

The present invention relates to agricultural combine harvesting machinery, and more particularly to reels for agricultural harvesting heads.

BACKGROUND OF THE INVENTION

Combines are large self-propelled vehicles used for harvesting and threshing agricultural crop in the field. A harvesting head is typically disposed across the front of the combine vehicle supported on a feederhouse. This harvesting head is configured to cut and convey the crop into the combine vehicle itself where it is threshed, separated, and cleaned.

Traditional harvesting heads included an elongate rigid frame to which harvesting implements were added such as cutterbars, augers, reels, and endless belt conveyors. More recently, the once rigid frame has been replaced by multiple frame sections that are coupled together to pivot with respect to each other. A typical arrangement has a center frame and left and right wing frames that are coupled to the center frame to pivot with respect to the center frame. This arrangement requires that the other elements in the harvesting head also be pivotable with respect to each other. This multiple frame arrangement permits the wider harvesting heads to more accurately follow the contours of the ground as they are harvesting, and therefore to cut more crop.

Attempts have been made to create pivoting reels that are supported at each end on reel support arms that extend forward from the frame sections. In this manner, when the two wing frames pivot up or down with respect to the center frame, reels sections that are mounted on the wing frames can also pivot up and down with respect to a center reel section mounted on the center frame.

One problem with this arrangement, however, is that a large gap must be provided between adjacent reel sections (and on either side of the reel support arm which is located between the adjacent reel sections) to permit the reel sections to pivot up and down without interfering with the reel support arms. As a practical matter, this gap is so wide that crop located between the adjacent ends of the reel sections falls on the ground.

What is needed is an improved reel arrangement that permits adjacent reels to pivot with respect to each other yet provides a small enough gap (or no gap at all) such that crop is not lost yet the adjacent reel sections can pivot with respect to each other. These and other advantages of the invention are provided by claim 1. Further advantages are provided by additional claims dependent upon claim 1.

SUMMARY OF THE INVENTION

In accordance with a first embodiment of the invention, a flexible reel for an agricultural harvesting head comprises a plurality of reel sections coupled together at their axle ends with flexible couplings and supported on reel support arms that are offset from the axle ends. The bats of adjacent reel sections overlap each other and are interleaved with each other. This eliminates the gap between the bats at the ends of adjacent reel sections that would otherwise exist if the reel support arms were located right at the flexible coupling between the reels.

BRIEF DESCRIPTION OF THE DRAWINGS

FIG. 4 is a front view of the left side pivot joint of FIG. 3 showing the left reel section pivoted downward with respect to the center reel section.

FIG. 5 is a front view of the left side pivot joint of FIGS. 3-4 showing the left reel section pivoted upward with respect to the center reel section.

DETAILED DESCRIPTION OF THE PREFERRED EMBODIMENT

Figure 1:
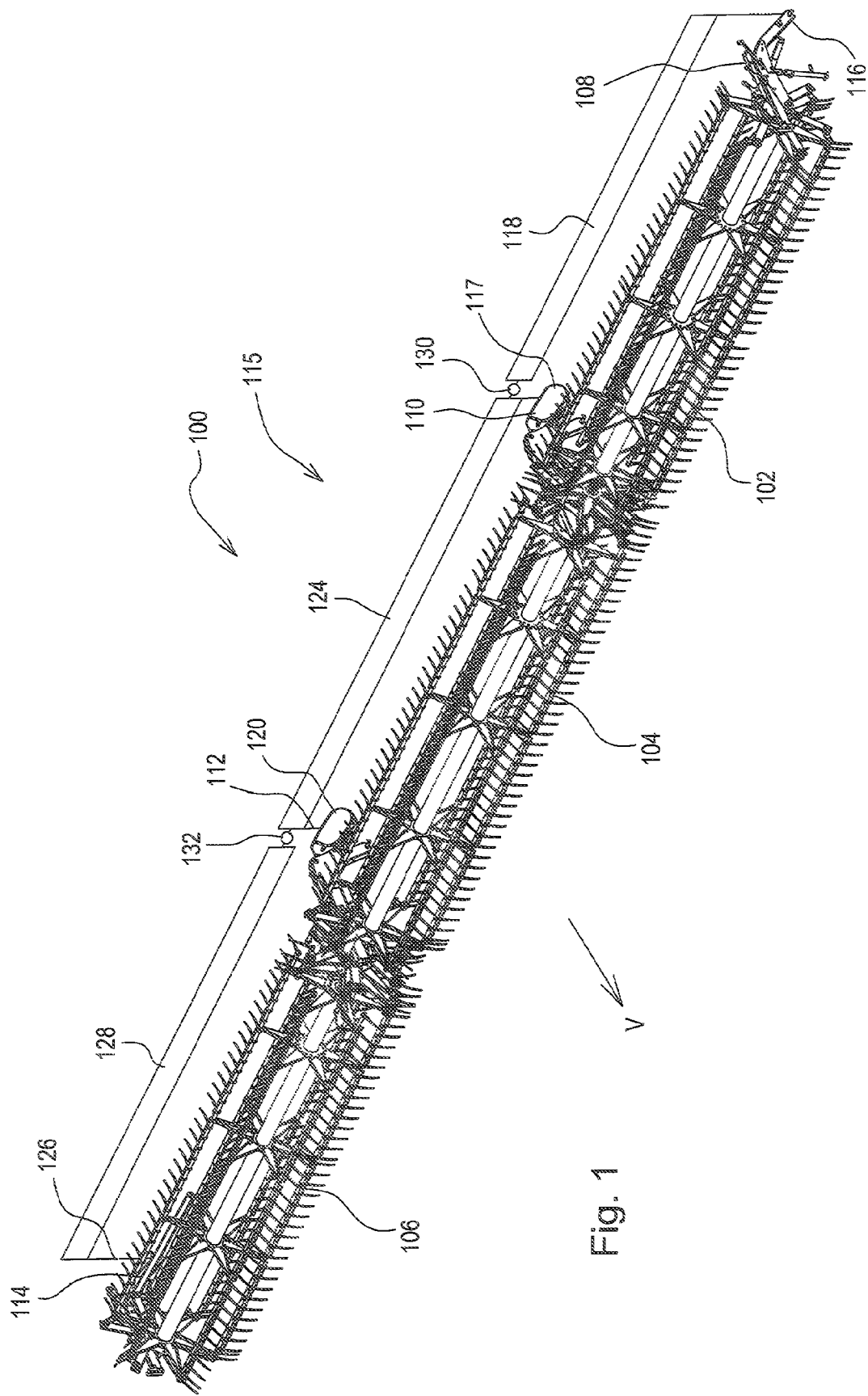
FIG. 1 is a perspective view of a flexible reel in accordance with the present invention.

In FIG. 1, a flexible reel 100 is illustrated comprised of three reel sections 102, 104, 106 pivotally coupled to each other. These three reel sections are generally coaxial, although they can pivot slightly with respect to each other, such that left reel section 102 and right reel section 106 can pivot slightly up and down with respect to center reel section 104 about generally horizontal and forwardly extending ("V") axes.

The flexible reel 100 is supported on four reel support arms 108, 110, 112, and 114. The rear ends of reel support arms are coupled to a harvesting head 115 that is configured to cut and gather crop. Reel support arm 108 has a rear end 116 that is pivotally coupled to left frame 118 of harvesting head 115. Reel support arms 110, 112 have rear ends in 117, 120, respectively, that are pivotally coupled to center frame 124 of harvesting head 115. Reel support arm 114 has a rear end 126 that is pivotally coupled to right frame 128 of harvesting head 115.

Left, center, and right frames 118, 124, 128, of harvesting head 115 are pivotally connected to each other at pivot joints 130, 132. Pivot joints 130, 132 are configured to permit each frame to pivot about a generally horizontal axis that extends in the direction of travel "V" of the harvesting head 115 and flexible reel 100 as it travels through the agricultural field harvesting crop. Since the frame sections pivot up and down with respect to each other, the reel support arms mounted on each frame section also pivot up and down with respect to each other.

Figure 2:
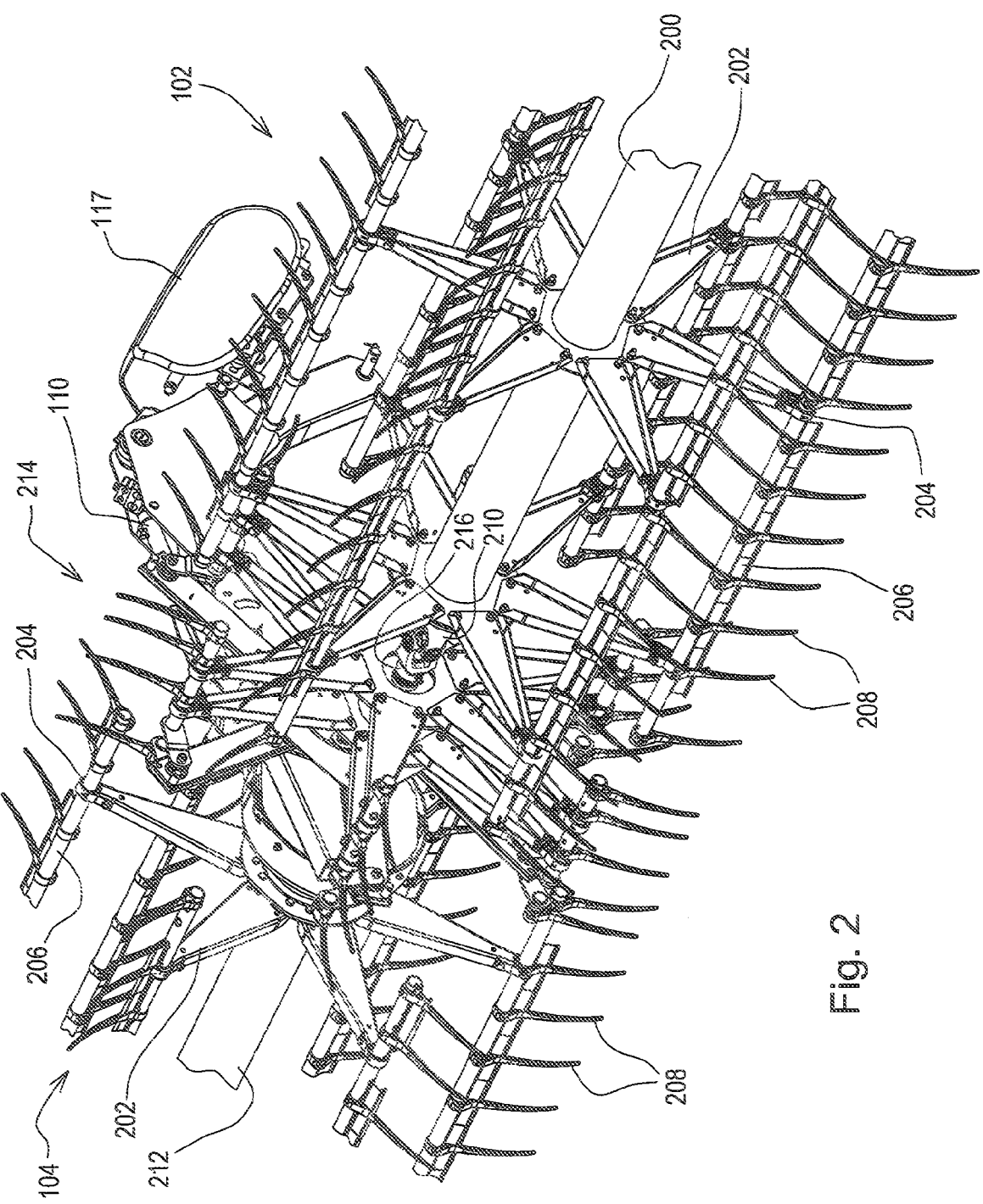
FIG. 2 is a fragmentary detail view of the reel of FIG. 1 showing the left side pivot joint of the flexible reel.
Figure 3:
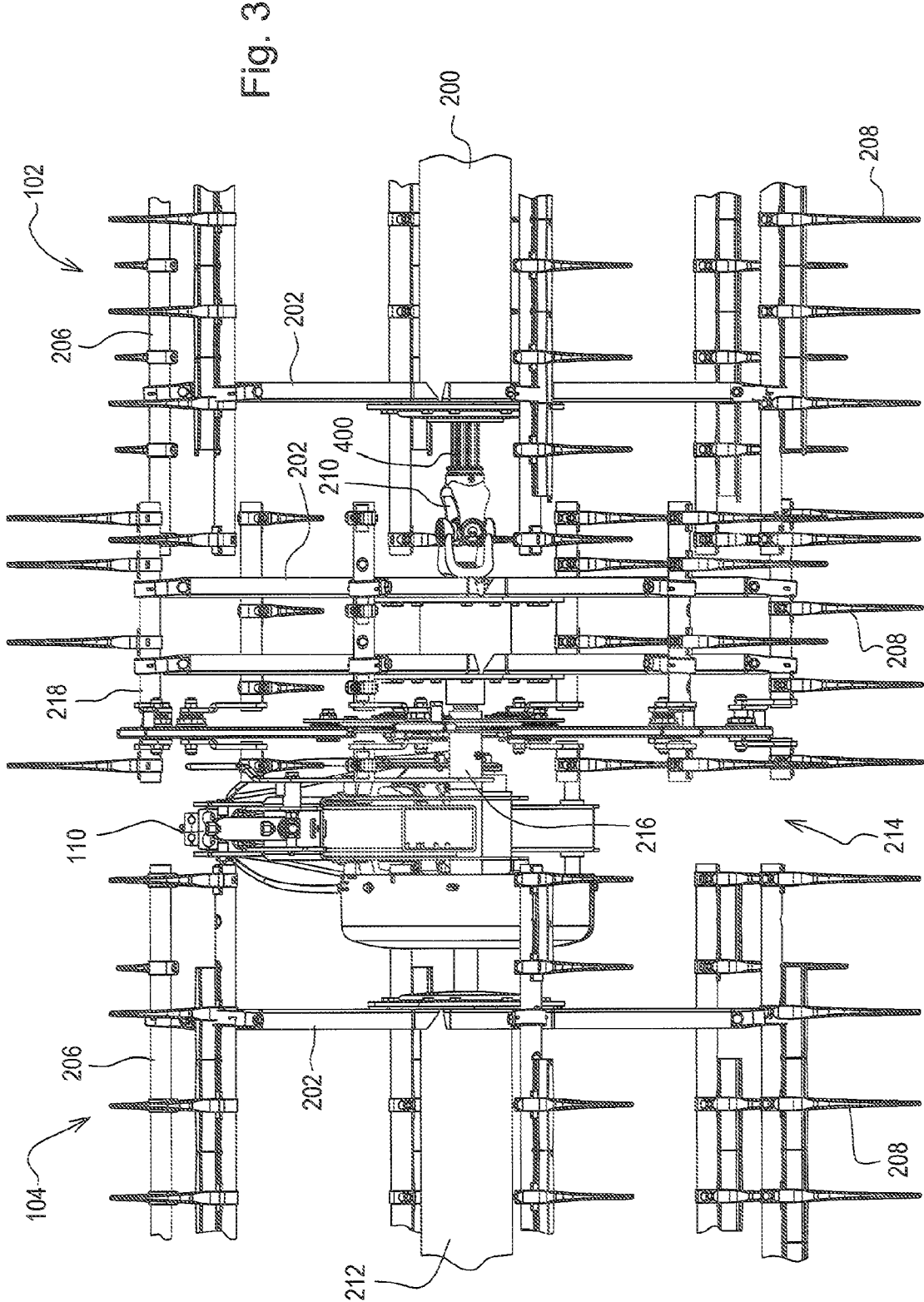
FIG. 3 is a front view of the left side pivot joint of FIG. 2 when the rotational axes and axles of the left and center reel sections are coaxial.

Referring now to FIGS. 2 and 3, reel support arm 110 is illustrated showing in greater detail the connections between the reel support arm 110 and the reel section 102 and the reel section 104. Reel section 102 is configured identically to reel section 106, but in mirror image relation. Similarly, reel support arm 110 is configured identically to reel support arm 112, but in mirror image relation. Reel section 104 is constructed identically at each end, but in mirror image relation. The flexible reel 100 is mirrored about a mirror plane drawn perpendicular to the rotational axis of reel section 104 that extends through the midpoint of reel section 104.

Reel section 102 includes a longitudinal axle 200 to which frame members 202 are attached. Frame members 202 extend radially outward from axle 200. The outer ends of frame members 202 include bearings 204 which support bats 206. Tines 208 are fixed to bats 206. Frame members 202 are radially and evenly spaced about the circumference of axle 200. In the example illustrated here, six frame members 202 are evenly spaced 60 degrees apart from each adjacent frame member around the circumference of axle 200. There are five sets of frame members 202 spaced apart longitudinally over substantially the entire length of axle 200. Each of these sets of frame members 202 are aligned with each other circumferentially such that each bat is supported for rotation on five bearings 204 disposed at the ends of five frame members 202.

Each bat has approximately thirty-five tines 208 that are generally spaced evenly apart along substantially the entire length of the bat. The spacing between adjacent tines is preferably between 10 and 20 cm. The tines 208 on each bat are oriented to extend outwardly in the same direction.

A flexible coupling 210, here shown as a universal joint, is fixed to the right end of axle 200. Flexible coupling 210 permits the rotational axes of the left reel section axle 200 and the center reel section axle 212 to pivot with respect to each other about a generally horizontal and forwardly extending axis, while at the same time ensuring that they rotate at the same speed and therefore maintain a constant angular orientation between bats on adjacent reel sections.

Flexible coupling 210 is also fixed to the right end of center reel section axle 212, which has similar frame members 202 affixed thereto, similar bearings 204, and similar bats 206 and tines 208 similarly mounted thereon.

Axle 212 is supported for rotation on reel support arm 110. Reel support arm 110 is not disposed at the very end of center reel section 104. Instead, it is supported near the end, such that an end portion 214 of center reel section 104 is disposed between reel support arm 110 and the end of center reel section 104. End portion 214 of center reel section 104 includes two sets of six frame members 202 spaced apart on the end portion 216 of center reel section axle 212, which is also disposed outside and extends outwardly beyond reel support arms 110 and 112. These two sets of six frame members 202 support six short bats 218 that are similarly supported on bearings 204 on the frame members 202 fixed on the outside end of axle 212.

Frame members 202 on the outside end of axle 212 are evenly spaced with respect to each other about axle 212, but are angularly shifted with respect to the bats in the reel section 102 by 30 degrees. This shifting permits the outermost ends of short bats 218 to overlap and interleave with the innermost ends of bats 206 of left reel section 102. In short, as best shown in FIG. 3, the ends of the bats overlap each other and are interleaved with each other in a direction parallel to their longitudinal axes. In the arrangement shown in FIG. 3, the central rotational axis of axle 200 in the central rotational axis of axle 212 are coaxial. This is the arrangement that would appear when left reel section 102, and right reel section 106 are not pivoted with respect to central reel section 104.

By overlapping the ends of bats 206 and short bats 218, tines on adjacent bats 206, 218 can be more closely spaced (in fact, in this case they overlap) and thereby prevent crop from falling to the ground and being lost between the ends of left reel section 102 and center reel section 104.

It should be clear that no overlap or interleaving between the bats would be possible when the left and right reel sections were pivoted upward, pivoted downward and in level position with respect to the center reel section if reel support arm 110 was also located between the very ends of left reel section 102 and center reel section 104 where the flexible coupling 210 is located. This is why reel support arm 110 has been disposed inwardly, slightly away from the very end of center reel section 104. As best shown in FIG. 3, a gap is necessary between bats 206 of center reel section 104 and short bats 218 of center reel section 104. However, since the flexible coupling 210 is not disposed at reel support arm 110, and therefore bats 206 and 218 of center reel section 104 do not pivot with respect to each other, they maintain a constant position with respect to each other, and therefore can be spaced quite close together. The bottom of FIG. 3 shows that this arrangement permits immediately adjacent tines 208 on bats 206, 218 to be spaced substantially the same axial distance apart that immediately adjacent tines on bats 206 are spaced apart.

In order to insure that bats 206 on left reel section 102 overlap with short bats 218 on center reel section 104 when left frame 118 pivots upward and downward with respect to center frame 124, axle 200 is permitted to change in length—to extend as left reel section 102 and left frame 118 pivot downward with respect to center reel section 104 in center frame 124. This extension of axle 200 is best shown in FIG. 4. Axle 200 includes a telescopic portion 400 that is telescopically received into and retracted out of tubular portion 402 of axle 200.

In FIG. 4, reel support arm 108 (not shown) has been lowered with respect to reel support arm 110 and the left reel section has been pivoted downward at its outer end with respect to the center reel portion to a position below the center reel portion. The outer end of the left reel portion is below the center reel portion if it is below a generally horizontal plane that is parallel to the rotational axis of the center reel portion and parallel to the direction of travel of the flexible reel through the field. The downward movement of reel support arm 108 applies an extension force on axle 200, pulling it away from axle 212, and causing telescopic portion 400 of axle 200 to extend farther from tubular portion 402 than is shown in FIG. 3.

In FIG. 5, reel support arm 108 (not shown) has been raised with respect to reel support arm 110 and the left reel portion has been pivoted upward at its outer end with respect to the center reel portion to a position above the center reel portion. The outer end of the left reel portion is above the center reel portion if it is above a generally horizontal plane that is parallel to the rotational axis of the center reel portion and parallel to the direction of travel of the flexible reel through the field. The upward movement of reel support arm 108 pushes axle 200 inward toward axle 212, and causes telescopic portion 400 of axle 200 to be pushed farther into tubular portion 402 than is shown in FIG. 3.

In each of the three relative positions shown in FIGS. 3, 4, and 5, the bats 206 at the bottom of left reel portion 102 and short bats 218 at the bottom of center reel portion 104 always overlap and interleave. To the entire range of relative positions from the position shown in FIG. 4, through the position shown in FIG. 3, and to the position shown in FIG. 5.

It is the tines 208 located on the bottom bats of left, center, and right reel portions 102, 104, 106 that engage the tops of the plants being harvested and pull them toward the individual frames 118, 124, 128 of the harvesting head 115.

In each of the three positions shown in FIGS. 3, 4, and 5, bats 206 of center reel section 104 and short bats 218 of center reel section 104 stay a constant angular distance apart.

This is because axle 212 supports bats 206 and short bats 218 of center reel section 104 for rotation about the same rotational axis regardless of the position of the flexible coupling 210.

The invention claimed is:

1. A flexible reel (100) for an agricultural harvesting head (115) comprising:

left, right and center reel sections (102, 106, 104), each section comprising a longitudinally extending axle (212, 200), each axle having a first plurality of bats (206) supported on the axle and spaced radially away from the axle, and each bat of the first plurality of bats (206) having a plurality of tines spaced apart along the length of each bat and extending therefrom;

first and second reel support arms (110, 112) disposed to support the center reel section axle (212) on its left and right sides for rotation about a generally horizontal axis coaxial with the center reel section axle (212) such that left and right axle end portions (216) of the center reel section axle (212) extend through the first and second reel support arms (110, 112) and are disposed outside of the first and second reel support arms (110, 112);

third and fourth reel support arms (108, 114) disposed at the left end of the left reel section (102) and at the right end of the right reel section (106), respectively, to support the left reel section axle (200) and the right reel section axle, respectively, for rotation about generally horizontal axes;

a first flexible coupling (210) that couples the right end of the left reel section axle (200) to the left end of the center reel section axle (212) to permit the left reel section and the center reel section to pivot with respect to each other;

a second flexible coupling that couples the left end of the right reel section axle to the right end of the center reel section axle to permit the right reel section and the center reel section to pivot with respect to each other;

wherein a second plurality of bats (218) are mounted on the left axle end portion (216) and the second plurality of bats (218) overlap and are interleaved with the first plurality of bats (206) on the left reel section (102) when an outer end of the left reel section (102) is pivoted above the center reel section (104) and when it is pivoted below the center reel section (104); and wherein a third plurality of bats are mounted on the right axle end portion of the center reel section axle and wherein the third plurality of bats overlap and are interleaved with the first plurality of bats (206) on the right reel section (106) when an outer end of the right reel section is pivoted both above and below the center reel section.

2. The flexible reel (100) of claim 1, further comprising an agricultural harvesting head (115) that comprises a plurality of frames pivotally coupled to one another which include a left frame (118) with left and right ends, a center frame (124) with left and right ends and a right frame (128) with left and right ends, wherein the right end of the left frame is pivotally coupled to the left end of the center frame, wherein the left end of the right frame is pivotally coupled to the right end of the center frame, and further wherein the first and second reel support arms (110, 112) are coupled to left and right portions of the center frame (124), wherein the third reel support arm (108) is coupled to the left frame, and the fourth reel support arm (112) is coupled to the right frame.

3. The flexible reel (100) of claim 1, wherein each bat (218) of the second and third pluralities of bats extends parallel to the center reel section axle (212).

4. The flexible reel (100) of claim 1, wherein every bat (218) of the second and third pluralities of bats are spaced a constant distance apart.

5. The flexible reel (100) of claim 1, wherein the left reel section axle (200) telescopes when the left reel section axle (200) pivots upward and downward with respect to the center reel section axle (212).

6. The flexible reel (100) of claim 1, wherein the right reel section axle telescopes when the right reel section axle pivots upward and downward with respect to the center reel section axle (212).

7. The flexible reel (100) of claim 1, wherein the first and second flexible couplings (210) are universal joints.

8. The flexible reel (100) of claim 7, wherein the first flexible coupling (210) flexes sufficient to permit the left reel section (102) to pivot above the center reel section (104) and sufficient to permit the left reel section (102) to pivot below the center reel section (104) while maintaining an overlap and interleave between bats (206, 218) on the bottom of the center reel section (104) and on the bottom of the left reel section (102).

9. The flexible reel (100) of claim 8, wherein the second flexible coupling flexes sufficient to permit the right reel section (106) to pivot above the center reel section (104) and to permit the right reel section (106) to pivot below the center reel section (104) while maintaining an overlap and interleave between bats (206, 218) on the bottom of the center reel section and on the bottom of the right reel section.

* * * * *